July 17, 1962

L. C. BLUE 3,044,723

WIRE ROPE TENSIONER

Filed Sept. 30, 1960

INVENTOR.
LLOYD C. BLUE,
BY
McMorrow, Berman & Davidson
ATTORNEYS.

July 17, 1962

L. C. BLUE 3,044,723

WIRE ROPE TENSIONER

Filed Sept. 30, 1960

INVENTOR.
LLOYD C. BLUE,
BY
McMorrow, Berman & Davidson
ATTORNEYS.

United States Patent Office 3,044,723
Patented July 17, 1962

3,044,723
WIRE ROPE TENSIONER
Lloyd C. Blue, 7403 Jay St., Houston, Tex.
Filed Sept. 30, 1960, Ser. No. 59,677
6 Claims. (Cl. 242—47.09)

This invention relates to improvements in line tensioning devices, and more particularly to a novel portable tensioner adapted to be used between a wire rope reel and an oil field service unit whereby the rope is given a tension substantially equal to that imposed on the rope by the weight of the length of rope from the service unit to a working implement in the oil well being serviced, as the rope is wound on the drum of the service unit, whereby cutting of successive layers of rope wound on the drum of the service unit into subjacent layers of rope thereon is eliminated, and smooth and level winding is assured.

The primary object of the invention is the provision of a compact, portable, and efficient tensioner of the kind indicated above, which involves a pair of similar grooved drums over which the rope to be tensioned is successively wound, and individual mechanically operated friction brakes for each of the drums.

Another object of the invention is the provision of a tensioner of the character indicated above, wherein individual brakes are provided at each end of the drums, and the force applying and the force maintaining means for each set of brakes is coordinated, that is, the brakes of the two drums, at the same ends of the drums are connected together so that they can be adjusted as a unit or separately, and the brakes at opposite ends of the drums are unconnected with each other, whereby compensations for uneven wear in individual brakes can be made without impairing or disturbing the adjustments of other brakes, and different braking forces can be exerted individually on the two drums where desirable.

A further object of the invention is to provide a simple and relatively inexpensive tensioner of the character indicated above, which is composed of a small number of uncomplicated and easily assembled parts, which are readily serviced, and replaceable, when necessary.

Other important objects and advantageous features of the invention will be apparent from the following description and the accompanying drawings, wherein, for purposes of illustration only, a specific form of the invention is set forth in detail.

Figure 3:
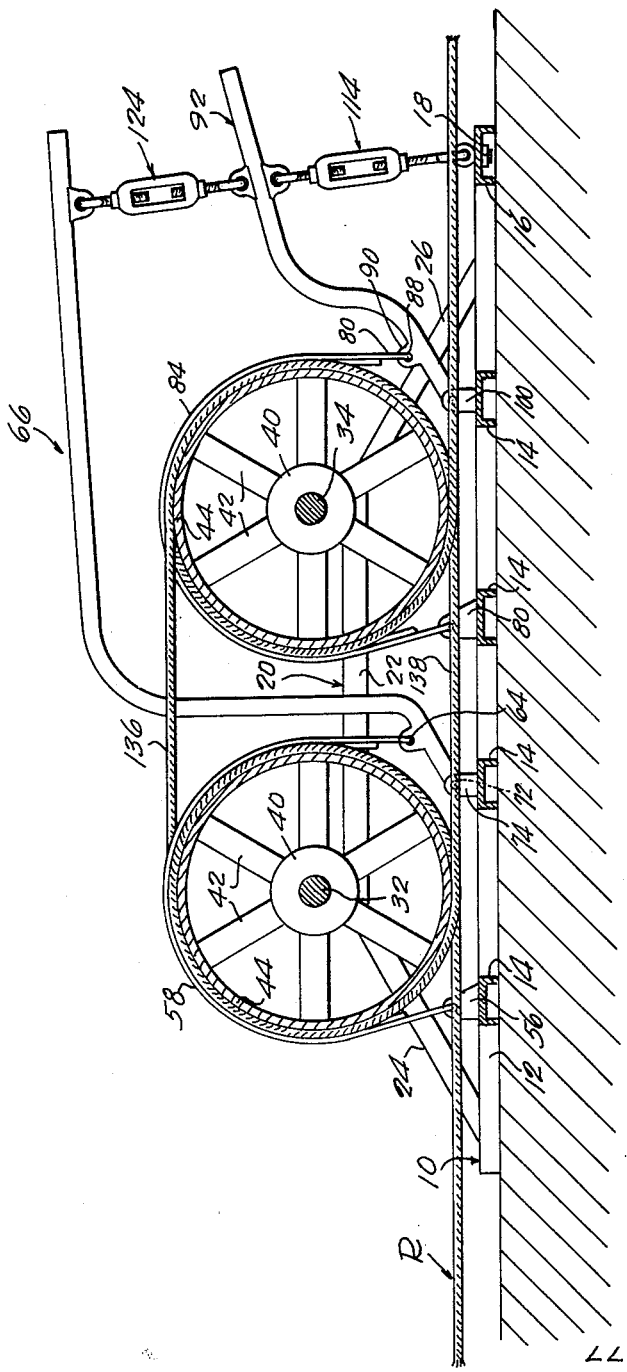
FIGURE 3 is a vertical longitudinal section taken on the line 3—3 of FIGURE 1.

Referring in detail to the drawings, wherein like numerals designate like parts throughout the several views, the illustrated tensioner comprises an elongated flat horizontal open base frame 10, preferably composed of longitudinal channel side members 12, between which longitudinally spaced channel cross members 14 extend. At the trailing or rear end of the frame 10, a rear channel cross member 16 extends between and is fixed to the side members 12, at their rear ends. The channel cross members are inverted, as shown in FIGURE 3, so that their webs 18 are uppermost.

Extending longitudinally along the side members are similar elongated bearing supporting frames 20, which can consist of a single length of solid bar or box-section bar, having a horizontal intermediate portion 22, spaced parallel above the related side member, and declining forward and rear end portions 24 and 26, which are suitably fixed, at their lower ends, to the upper sides or webs of the side members, at locations near to related ends of the side members.

Upon the intermediate portions 22 of the bearing frames, at the end thereof, are suitable fixed forward and rear similar bearing blocks 28 and 30, respectively, through which are severally journalled the ends of similar forward and rear transverse drum shafts 32 and 34, on which are fixed similar forward and rear drums 36 and 38, respectively.

The drums are mounted on the drum shafts preferably by means of radial heels 40, from which radial spokes or webs 42, on whose outer ends imperforate drum annuli 44 are fixed. The drum annuli 44 are formed with uniform diameter spiral grooves 46. Fixed upon the annuli 44, at the opposite ends thereof, are forward and rear brake drums 48 and 50 having flat peripheral friction surfaces which are spaced outwardly from the surfaces of the annuli 44. The inward sides of the brake drum 48 define stop shoulders 54, for emergency retention of wire rope on the rope drums 36 and 38.

As shown in FIGURE 3, at locations beneath the forward sides of the forward brake drums 48, upstanding brake band anchors 56 are fixed upon the forward intermediate frame cross member 14 of the base frame 10, and forward flexible brake bands 58, which overlie and surround the upper parts of the forward brake drums 48, have their forward ends pivoted to the anchors 56, as indicated at 60. Fixed on and extending downwardly from the rear ends of the forward brake bands 58 are straps 62 which are pivoted, as indicated at 64 to forward brake band tightening levers 66.

The forward tightening levers 66 are of reclining L-shape and comprise vertical forward portions 68 which terminate, at their lower ends, in forwardly and downwardly angled terminals 70. The terminals 70, at their forward ends, are pivoted, as indicated at 72, on upstanding lugs 74 which are fixed to a frame cross member 14 beneath the rear sides of the forward brake drums 48. The brake band straps 62 are pivoted to upstanding ears 76 on the terminals 70. The forward tightening levers 66 further comprise horizontally elongated, rearwardly extending portions 78, on the upper ends of the vertical portions 68, which extend rearwardly and spacedly above the rear rope drum 38, to points near the rear end of the base frame 10.

Fixed to and upstanding from a frame cross member 14 beneath the forward sides of the rear brake drums 50, are rear brake band anchors 80, to which are pivoted, as indicated at 82, the forward ends of rear brake bands 84 which overlie the upper halves of the rear brake drums 50. The rear brake bands 84 have pendant straps 86, on their rear ends, which are pivoted, as indicated at 88, to upstanding ears 90 on rear brake band tightening levers 92.

The rear tightening levers 92 are substantially of reclining L-shape and are substantially smaller and shorter than the forward tightening levers 66, and are in vertical alignment therewith. The rear levers 92 comprise vertical portions 94 which terminate at their lower ends in forwardly declining terminals 96, which, at their lower ends, are pivoted, as indicated at 98, to upstanding lugs 100 on a frame cross member 14, located beneath the rear sides of the rear brake drum 50. The rear brake drum straps 86 are pivoted to the upstanding ears 90 which are on the terminals 96. On the upper ends of the vertical lever portions 94 are horizontal, downwardly extending portions 104, which are spaced downwardly from the corresponding horizontal portions 78 of the forward tightening levers 66.

Figure 2:
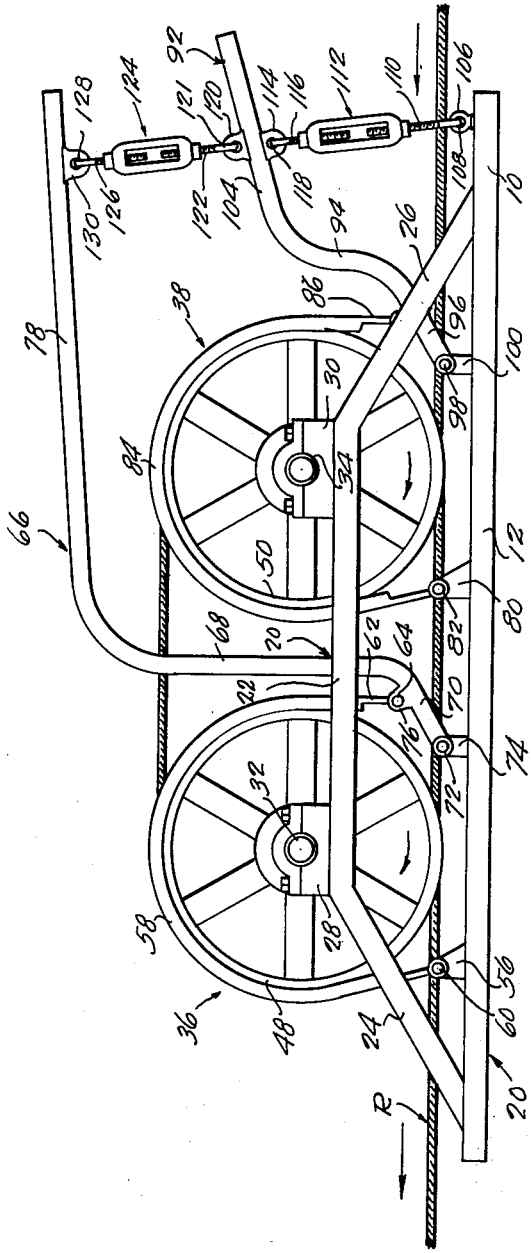
FIGURE 2 is a side elevation of the tensioner of FIGURE 1.

Fixed to and upstanding on the web 18 of the rear frame cross member 16, are eyes 106 through which are engaged the lower eyes 108 on the lower screws 110 of lower turnbuckles 112. The eyes 114 of the upper screws 116 of the lower turnbuckles 112 are engaged through pendant ears 118 on the undersides of the horizontal portions 104 of the rear tightening levers 92. The horizontal portions 104 have thereon upstanding ears 120, in line with the pendant ears 118, through which are engaged the eyes 121 of the lower screws 122 of upper turnbuckles 124. The upper turnbuckles 124 have upper screws 126 whose eyes 128 are engaged through pendant ears 130 on the undersides of the horizontal portions 78 of the forward tightening levers 66. As shown in FIGURES 2 and 3, the upper and lower turnbuckles are preferably in vertical alignment with each other in the same slightly forwardly angled plane.

When initial tightening of the brake bands on the brake drums is undertaken, the preferable procedure is to first tighten the rear brake bands on the rear brake drum 50 by shortening the lower turnbuckles 112, with the upper turnbuckles 124 extended. When the rear brake bands 84 have been thus tightened, the forward brake bands 58 are tightened on the forward brake drums 48 by shortening the upper turnbuckles 124. The foregoing obviously involves separate adjustments of the individual forward and rear brake bands. However, once the sets of forward and rear brake bands at opposite ends of the related drums have been made, there is coordinated action between the forward and rear tightening levers of the sets of brake bands, so that, for example, both levers of the sets can be moved to tighten or loosen the brake bands related thereto, merely by shortening or lengthening the related lower turnbuckles 112, since such changes in position of the rear tightening levers 92 are transmitted to the forward tightening levers 66, through the upper turnbuckles 124. When such coordinated adjustment does not produce desired adjustments of the forward brake bands, the difference is made up by adjusting the upper turnbuckles 114.

Figure 1:
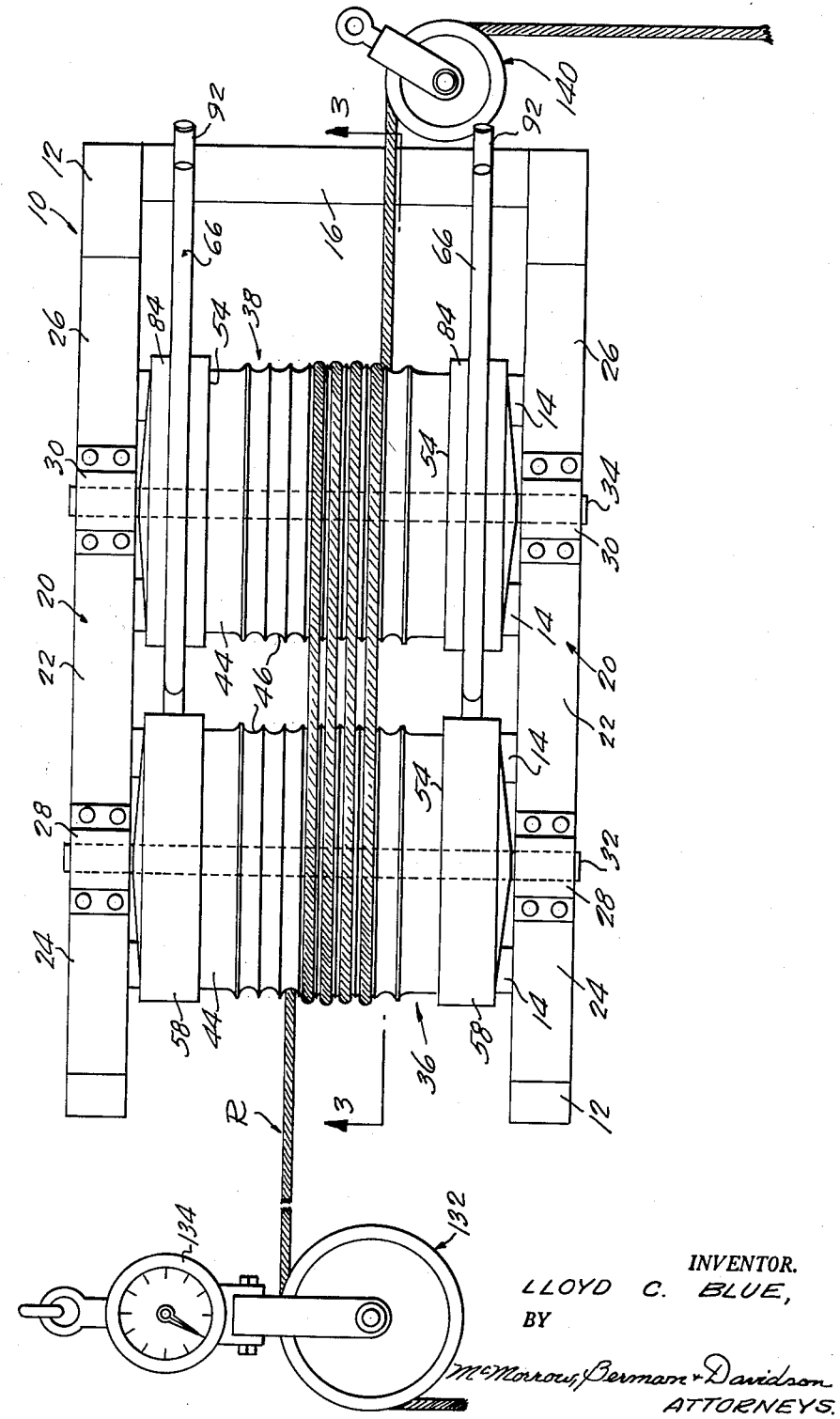
FIGURE 1 is a top plan view of a tensioner of the present invention, showing a wire rope wound around the drums, the rope leading thereto, from an anchored floor block and weight indicator, and leading to a floor block to a service unit (not shown)

In operation, and in accordance with the method of the present invention, a wire rope R to be wound upon the drum of a service unit (not shown) is trained, as shown in FIGURE 1, from a well head (not shown) around a suitably anchored leading floor block 132, with which a weight indicator 134 is operatively associated, and trained under and several times around both rope drums 36 and 38 in successive grooves 46 thereof, the upper and lower rope flights 136 and 138, respectively, thus formed, being trained around both the forward and rear drums, in vertical alignment with each other, from the same ends of the drums, and in corresponding or aligned grooves 46 of the drums, toward the other ends of the drums. The wire rope R comes off the rear drum 38, at the lower side thereof, and is trained around a suitably anchored trailing floor block 140, and leads therefrom to the drum of the service unit.

It will be understood from the foregoing that the coordinated braking of the forward and rear rope drums 36 and 38, respectively, plus the fact that the wire rope R is wound around both drums and the drums have substantially equal frictional grips on the rope, with proper adjustment of the brake bands, the required tension on the rope R beyond the leading floor block 132, and between the trailing floor block 140 and the service unit on which the rope is to be reeled, can be reliably produced and maintained, and varied at will.

Although there have been shown and described herein preferred forms of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A wire rope tensioner comprising a base frame having forward and rear ends, longitudinally spaced rotary forward and rear rope drums mounted upon and extending across the frame, said drums having annuli, brake drum means on ends of the annuli having peripheral friction surfaces, forward tensioning lever means and rear tensioning lever means, said lever means being pivoted on the base frame, brake bands engaged around said surfaces and having first ends secured to the frame and second ends pivoted to the related tensioning lever means, and lever adjusting means connected to the lever means and to the base frame, said annuli having spiral rope receiving grooves thereon, the grooves of the forward and rear drums being aligned with each other, said forward lever means being pivoted to the base frame at a location between the forward and rear rope drums, and said rear lever means being pivoted on the base frame behind the rear rope drum, said lever means having rearwardly extending portions, said portions being vertically spaced from each other, said adjusting means comprising lower contractile means extending between and connected to the base frame and the portion of the rear lever means, and upper contractile means extending between and connected to the said portion of the rear lever means and the said portion of the forward lever means.

2. A wire rope tensioner comprising a base frame having forward and rear ends, longitudinally spaced rotary forward and rear rope drums mounted upon and extending across the frame, said drums having annuli, brake drum means on ends of the annuli having peripheral friction surfaces, forward tensioning lever means and rear tensioning lever means, said lever means being pivoted on the base frame, brake bands engaged around said surfaces and having first ends secured to the frame and second ends pivoted to the related tensioning lever means, and lever adjusting means connected to the lever means and to the base frame, said annuli having spiral rope receiving grooves thereon, the grooves of the forward and rear drums being aligned with each other, said forward lever means being pivoted to the base frame at a location between the forward and rear rope drums, and said rear lever means being pivoted on the base frame behind the rear rope drum, said lever means having rearwardly extending portions, said portions being vertically spaced from each other, said adjusting means comprising lower contractile means extending between and connected to the base frame and the portion of the rear lever means, and upper contractile means extending between and connected to the said portion of the rear lever means and the said portion of the forward lever means, said rearwardly extending portions being substantially horizontal and vertically spaced from each other in the same vertical plane.

3. A wire rope tensioner comprising a base frame having forward and rear ends, longitudinally spaced rotary forward and rear rope drums mounted upon and extending across the frame, said drums having annuli, brake drum means on ends of the annuli having peripheral friction surfaces, forward tensioning lever means and rear tensioning lever means, said lever means being pivoted on the base frame, brake bands engaged around said surfaces and having first ends secured to the frame and second ends pivoted to the related tensioning lever means, and lever adjusting means connected to the lever means and to the base frame, said annuli having spiral rope receiving grooves thereon, the grooves of the forward and rear drums being aligned with each other, said forward lever means being pivoted to the base frame at a location between the forward and rear rope drums, and said rear lever means being pivoted on the base frame behind the rear rope drum, said lever means having rearwardly extending portions, said portions being vertically spaced from each other, said adjusting means comprising lower contractile means extending between and connected to the base frame and the portion of the rear lever means, and upper contractile means extending between and connected to the said portion of the rear lever means and the said portion of the forward lever means, said rearwardly extending portions being substantially horizontal and vertically spaced from each other in the same vertical plane, said lower and upper contractile means comprising lower and upper turnbuckles.

4. A wire rope tensioner comprising a horizontal base frame having forward and rear ends, longitudinally spaced transverse rotary rope drums mounted upon the base frame, said rope drums comprising annuli having opposed ends, annular brake drums on the ends of the annuli, brake bands extending around the upper parts of the brake drums, said brake bands having forward and rear ends, the forward ends of the brake bands being anchored to the base frame, forward brake band tightening levers pivoted on the base frame and in front of the forward drum, the rear ends of the brake bands of the forward drum being operatively connected to the forward levers, rear brake band tightening levers pivoted to the base frame behind the rear rope drum to which the rear ends of the brake bands of the rear rope drum are connected, said forward and rear levers having rearwardly extending horizontal portions, said horizontal portions being in vertically spaced relationship to each other and to the base frame, lower adjustable contractile members extending between and connected to the base frame and the horizontal portions of the rear levers, and upper adjustable contractile members extending between and connected to the horizontal portions of the rear levers and the horizontal portions of the forward levers.

5. A wire rope tensioner comprising a horizontal base frame having forward and rear ends, longitudinally spaced transverse rotary forward and rear rope drums mounted upon the base frame, said rope drums comprising annuli having opposed ends, annular brake drums on the ends of the annuli, brake bands extending around the upper parts of the brake drums, said brake bands having forward and rear ends, the forward ends of the brake bands being anchored to the base frame in front of the drums, forward brake band tightening levers pivoted on the base frame between the drums, the rear ends of the brake bands of the forward drum being operatively connected to the forward levers, rear brake band tightening levers pivoted to the base frame behind the rear rope drum to which the rear ends of the brake bands of the rear rope drum are connected, said forward and rear levers having rearwardly extending horizontal portions, said horizontal portions being in vertically spaced relationship to each other and to the base frame, lower adjustable contractile members extending between and connected to the base frame and the horizontal portions of the rear levers, and upper adjustable contractile members extending between and connected to the horizontal portions of the rear levers and the horizontal portions of the forward levers, said upper and lower contractile members being upper and lower turnbuckles.

6. A wire rope tensioner comprising a horizontal base frame having forward and rear ends, longitudinally spaced transverse forward and rear rotary rope drums mounted upon the base frame, said rope drums comprising annuli having opposed ends, annular brake drums on the ends of the annuli, brake bands extending around the upper parts of the brake drums, said brake bands having forward and rear ends, the forward ends of the brake bands being anchored to the base frame, forward brake band tightening levers pivoted on the base frame and between the drums, the rear ends of the brake bands of the forward drum being operatively connected to the forward levers, rear brake band tightening levers pivoted to the base frame behind the rear rope drum to which the rear ends of the brake bands of the rear rope drum are connected, said forward and rear levers having rearwardly extending horizontal portions, said horizontal portion being in vertically spaced relationship to each other and to the base frame, lower adjustable contractile members extending between and connected to the base frame and the horizontal portions of the rear levers, and upper adjustable contractile members extending between and connected to the horizontal portions of the rear levers, and the horizontal portions of the forward levers, and means mounting the rope drums on the base frame comprising upstanding bearing frames on and extending along opposite sides of the base frame, forward and rear bearings mounted upon the bearing frames, said drums having shafts journalled at their ends in related bearings.

References Cited in the file of this patent
UNITED STATES PATENTS

| 1,333,862 | McCollum | Mar. 16, 1920 |
| 1,462,604 | Lavalle | July 24, 1923 |
| 2,766,945 | Reich | Oct. 16, 1956 |
| 2,773,587 | Middleditch | Dec. 11, 1956 |
| 2,948,483 | Petersen | Aug. 9, 1960 |

FOREIGN PATENTS

| 296,449 | Switzerland | Apr. 17, 1954 |